No. 763,360. PATENTED JUNE 28, 1904.
W. P. BRETT.
WINDMILL PITMAN AND MEANS FOR ITS AUTOMATIC LUBRICATION.
APPLICATION FILED MAR. 6, 1902.
NO MODEL.
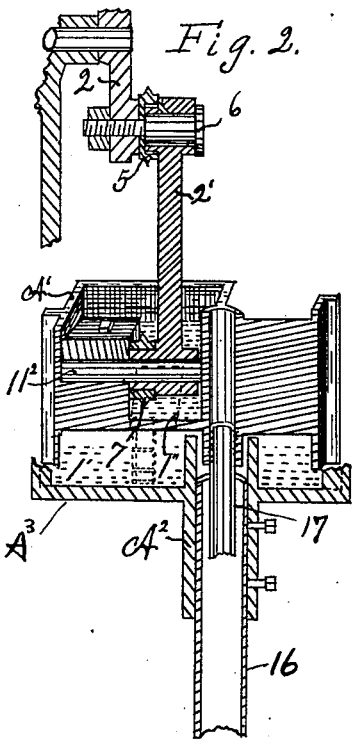
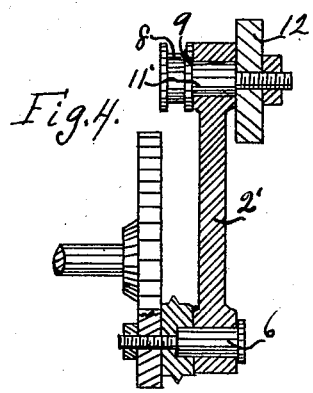
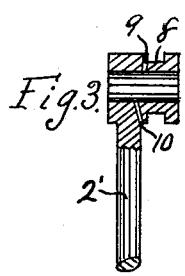
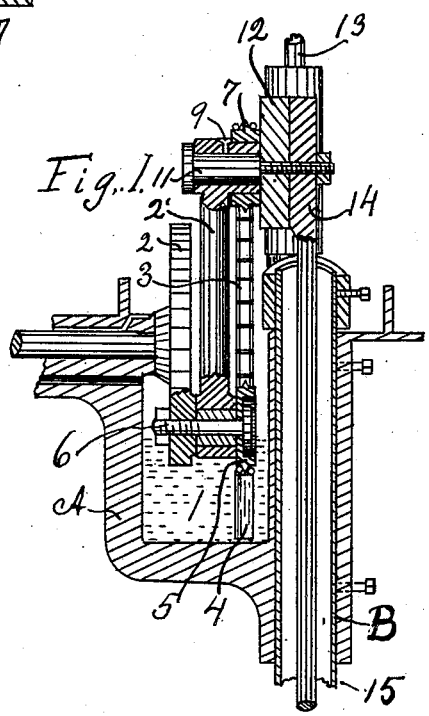
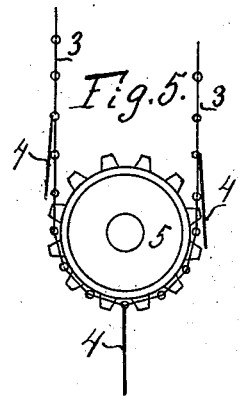
Witnesses.
Frank Ewing
Samuel R. Gher
Inventor.
William P. Brett.

No. 763,360.

Patented June 28, 1904.

UNITED STATES PATENT OFFICE.

WILLIAM P. BRETT, OF DECATUR, ILLINOIS.

WINDMILL-PITMAN AND MEANS FOR ITS AUTOMATIC LUBRICATION.

SPECIFICATION forming part of Letters Patent No. 763,360, dated June 28, 1904.

Application filed March 6, 1902. Serial No. 96,950. (No model.)

*To all whom it may concern:*

Be it known that I, WILLIAM P. BRETT, a citizen of the United States, residing at Decatur, in the county of Macon and State of Illinois, have invented a new and useful Improvement in Windmill-Pitmen and Means for Their Automatic Lubrication, of which the following is a specification.

My invention relates to that class of windmills in which the pitman is arranged to operate in either a vertical or at an inclination from a vertical position, and has for its object the production of an automatically-lubricated pitman that is cheap to manufacture and in which the material of which it is composed is so distributed as to best resist the strains to which it will be subjected. I attain this object by the mechanism illustrated in the accompanying drawings, of which—

Figure 1 is a sectional view showing parts of a windmill which coact in this invention; Fig. 2, a vertical section through parts of a modified form in which the pitman operates in a reverse position to that shown in Fig. 1. Fig. 3 illustrates a modified form of the reciprocating end of the pitman. Fig. 4 illustrates another modified form of pitman and reciprocating wrist-pin, and Fig. 5 is an enlarged side view of the lower portion of the oil-elevating chain or link belt and the driving-sprocket therefor as used in the form shown in Fig. 1.

Similar characters refer to similar parts throughout the several views.

The main frame or turn-table of the windmill is only partially shown in the drawings and is indicated by the letter A in Fig. 1 and the letter $A^3$ in Fig. 2 and is provided with a vertically-apertured part, (indicated by the letter B in Fig. 1 and the letter $A^2$ in Fig. 2.) The tubular shafts 15 and 16 are adapted to enter and be rigidly fixed in the vertical aperture of the parts B and $A^2$, substantially as shown, and constitute therewith the pivot portion of the main frame or turn-table, thus providing a central vertical opening through the anchorage portion of the turn-table, through which the reciprocating shafts 14 and 17 are adapted to operate, these shafts being necessarily only partially shown in the drawings.

By means of this pivot portion and the structure shown in connection therewith the turntable is adapted to be rotatably mounted at the top of a tower or any suitable structure and to carry with it in its rotation the oil-reservoir, (indicated by 1 in Fig. 1 and 1' in Fig. 2.)

2 is the crank or rotatable member of the mill and is also carried by the main frame A and may be mounted to operate partially within the oil-receptacle, as seen in Fig. 1, or entirely above it, as seen in Fig. 2.

2' is the pitman and is pivoted on the crank wrist-pin 6 at one end and on the reciprocating wrist-pin 11 at the other end, which is anchored to the cross-head or reciprocating part 12.

Still referring to Fig. 1, 5 is a sprocket-wheel rigidly secured to the outer end of the wrist-pin 6, and 7 is a sprocket-wheel rotatably mounted and arranged to move bodily with the reciprocating end of the pitman. 3 is an endless chain or link belt mounted upon sprockets 5 and 7 and moving bodily with the pitman in its oscillatory motion in such manner that the portion of the chain that is next to the lower end of the pitman comes in contact during the operation of the windmill with the lubricant contained in the reservoir immediately therebelow. The sprocket 5 being made rigid with the crank acts as a driving-sprocket for the chain, causing it to move at each revolution of the crank a distance equal to the circumference of the sprocket, so that upon the rotation of the crank the chain or link belt 3 is soon coated all over with oil, a portion of which will flow into the oil-duct 9 on the upper portion of the upper pitman-bearing, which leads to the wrist-pin therein, the lower wrist-pin of the pitman being lubricated either by contact with the oil in the reservoir or by the oil that flows onto it from the sprocket or the portion of the oil-elevating device adjacent thereto. In Fig. 2 is shown the same pitman and chain or link belt lubricating apparatus that is shown in Fig. 1, but applied to a pitman that is arranged to operate in a reversed position, in which the reciprocating end of the pitman is below the crank. With this arrangement of the pitman a modified form of tact with the lubricant contained therein and automatically lubricate said wrist-pins upon the rotation of said member.

8. In combination, a rotatable member, a reciprocating part, a pitman operatively connected and adapted to impart a reciprocal motion to said part upon the rotation of said member, an oil-elevating device operatively connected with said member and extending to the end of the pitman farthest therefrom, and an oil-receptacle so mounted that said device is caused to operatively contact with the lubricant contained therein upon the rotation of said member and thereby automatically lubricate the bearings of said pitman.

9. In combination, a rotatable member, a reciprocating part, a pitman operatively connected to said member and part and adapted to impart motion from one to the other, an oil-elevating device extending approximately from end to end of said pitman and so mounted as to oscillate therewith, an oil-receptacle mounted mainly below said pitman, and means whereby a traveling belt-like motion is imparted to said device upon the rotation of said member.

10. In combination a main frame, an oil-receptacle mounted in connection therewith, a rotatable member, a reciprocating part, a pitman operatively connected to said member and part and adapted to impart motion from one to the other, an endless flexible member extending from end to end of said pitman, operatively mounted, and adapted to move bodily therewith, auxiliary oil-gathering parts flexibly attached to said flexible member, and means whereby a traveling belt-like motion is imparted to said endless member upon the rotation of said rotatable member.

11. In combination, a main frame, an oil-receptacle mounted in connection therewith, a rotatable member, a reciprocating part, a pitman operatively connected to said member and part and adapted to impart motion from one to the other, an endless flexible member extending from end to end of said pitman, operatively mounted, and adapted to move bodily therewith, and means whereby a traveling, belt-like, motion is imparted to said endless member upon the reciprocation of said part.

12. In combination a main frame provided with a substantially vertically apertured anchorage portion, a rotatable member, a reciprocating part adapted to extend operatively through the vertical aperture of the said anchorage portion, a pitman in operative connection with said member and part, an oil-reservoir mounted with its bottom portion below the operative range of the lowermost part of the said pitman, and means for automatically supplying lubricant, taken from the said reservoir, to the uppermost frictional parts of said pitman during the operation of said member and part.

13. In combination a main frame or turn-table provided with a vertically-apertured pivotal anchorage portion, a rotatable member and a receiprocating part mounted one above the other, a pitman operatively connected, near its respective ends, to the said member and part, an oil-reservoir mounted with its bottom portion below the operative range of the lowermost of the said pitman ends, and means adapted to be actuated by the said member so as to automatically lubricate both of the said pitman connections when the lubricant in the said reservoir is below the operative range of the lowermost part of the said ends and as effectively during the oscillation or swinging of the said main frame or turn-table, about the vertical center line of the said anchorage portion, as when the said turn-table is stationary.

14. In combination a main frame or turn-table provided with a vertically-apertured pivot portion, a rotatable member and a reciprocating part operatively mounted one above the other and carried by the said main frame or turn-table, a pitman operatively connected to the said member and part, an oil-reservoir so mounted that its bottom portion is below the operative range of the lowermost part of the said pitman, and means adapted to automatically take lubricant from the extreme bottom portion of the said reservoir and cause it to lubricate the frictional parts at both ends of the said pitman upon the rotation of the said member, and during the oscillation of the said main frame upon the said pivot portion and the reciprocation of the said part through the said vertical aperture and without causing a waste or drippage of oil through the said aperture.

15. In combination a main frame provided with an anchorage portion about the vertical center line of which it is adapted to rotate, a vertical aperture through the said anchorage portion, an oil-reservoir carried by said frame, a rotatable member and a reciprocating part mounted mainly above the said reservoir, a pitman operatively connected to the said member and part, power-transmitting means connected to the said part and extending operatively through the said vertical aperture, and means for automatically lubricating both bearings of said pitman with oil from the said reservoir upon the rotation of said member.

16. In combination a main frame provided with a vertically-apertured pivot portion, a rotatable member, a reciprocating part, an oil-reservoir below said member and part, a pitman in operative connection with said member and part, and means in operative connection with the said member and part whereby lubricant is automatically carried from the said reservoir to the uppermost of the bearings of the said pitman upon the rotation of the said member.

17. In combination a main frame provided